UNITED STATES PATENT OFFICE.

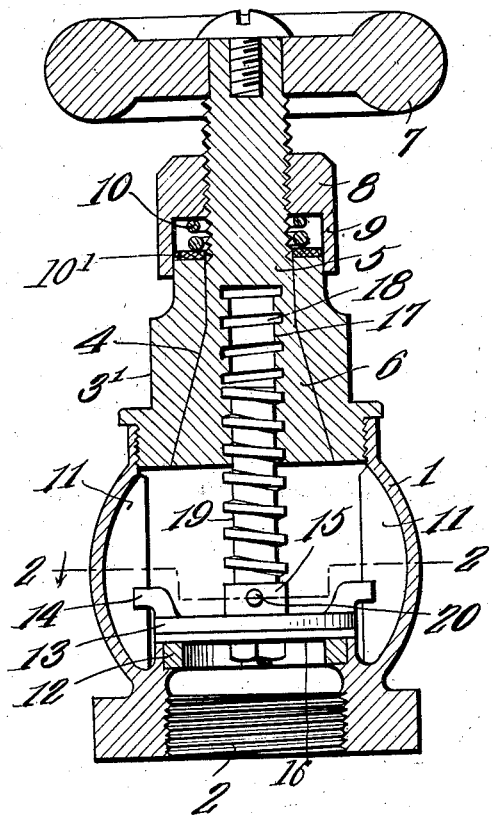

JAMES WALP, OF ALLENTOWN, PENNSYLVANIA.

VALVE.

1,110,731.  Specification of Letters Patent.  Patented Sept. 15, 1914.

Application filed January 10, 1911. Serial No. 601,836.

*To all whom it may concern:*

Be it known that I, JAMES WALP, a citizen of the United States, residing at Allentown, in the county of Lehigh and State of Pennsylvania, have invented a new and useful Valve, of which the following is a specification.

It is the object of the present invention to provide a valve in which the guides for the valve head are so constructed that steam, entering a primary nipple, will be deflected by the guides so as to pass through a rectangularly disposed secondary nipple, the guides being widest opposite the axis of the primary nipple, thus to present a maximum deflecting surface to the entering steam, and to serve as reinforcements, of maximum strength, for a spherical casing.

In the accompanying drawings—Figure 1 is a sectional elevation of a valve constructed in accordance with the invention. Fig. 2 is a sectional plan view of the same cut on the line 2—2 of Fig. 1.

The valve consists of a spherical casing 1 which is provided with coupling nipples 2 and 3 arranged in the usual manner for connection with the steam pipe, a radiator pipe, or other points where the steam is to flow, the nipple 3 being referred to hereinafter as the primary nipple and the nipple 2 being referred to as the secondary nipple.

A bonnet 3' is screw threaded into the top of the casing 1 and is provided with a concentric conical recess or bore 4 the larger end of which is at the lower end of the said bonnet. A stem 5 is journaled in the bonnet and is provided at its lower end with an enlarged conical head 6 which is adapted to fit snugly against the conical surface of the recess 4. An operating handle or hand wheel 7 is fixed to the upper projecting end of the stem 5 in the usual manner and a nut 8 is adjustably mounted or threaded upon the intermediate portion of the said stem and is provided at its lower portion with a depending hood or annular apron 9 which fits slidably over the upper circular reduced portion of the bonnet 3'. The adjustment of the nut 8 upon the stem 5 may be accomplished by screw thread connections as illustrated and which are usually employed.

A coiled wire compression spring 10 is interposed or seated between the washer 10' seated on the reduced upper end of the bonnet 3' and the lower side of the nut 8 and is housed within the hood 9. It is evident that the periphery of the washer 10' snugly engages the hood or apron 9. The said spring is under tension with a tendency to hold the stem 5 elevated in the bonnet 3' so that the outer side of the head 6 is held in close contact with the conical surface of the recess 4 provided in the said bonnet. The casing 1 is provided within its interior with vertically disposed guides 11 which are located at the opposite sides of the said casing. A valve seat 12 is mounted within the casing 1 over the inner end of the nipple 2 and within the lower end portions of the guides 11. A valve 13 is arranged to move vertically within the casing 1 and is provided at its diametrically opposite sides with pairs of guiding lugs 14 the members of each pair receiving between them the inner edge portions of the guides 11. The valve 13 is provided upon its upper side with a cuff 15 and upon its lower side with a washer 16 which is adapted to have contact with the seat 12 when the valve 13 is closed whereby the steam passage way through the casing 1 is interrupted. The lower portion of the stem 5 and the head 6 thereof is provided with a bore 17 which in turn is provided with a screw thread 18. An externally threaded valve stem 19 engages the thread 18 within the bore 17 at its upper end and at its lower end is seated within the cuff 15 and is secured therein by means of a pin 20 which passes transversely through the said stem 19 and the opposite side portions of the said cuff.

It will be seen that when the stem 5 is turned by an operator using the handle 7 that the head 6 will remain seated against the conical surface of the recess 4 under the tension of the spring 10 while the thread 18 of the bore 17 engaging the thread of the stem 9 will cause the said stem to move rapidly and longitudinally within the casing 1 whereby the valve 13 will be carried toward or away from the seat 12.

It is to be noted that the guides 11 are located at right angles to the axis of the primary nipple 3, and parallel to the axis of the secondary nipple 2, the guides extending from the secondary nipple to a point adjacent the bonnet 3'. The inner edges of the guides 11 are parallel, the parallel edges being disposed in close relation to the bore of the secondary nipple 2. Noting particularly Fig. 2, it will be observed that when a fluid, such as steam or the like, enters the primary nipple 3, the steam, following the wall of the casing, will engage with the guides 11 and be deflected inwardly, toward the center of the casing, for passage through the secondary nipple 2. The whole volume of steam will thus be deflected, owing to the fact that the guides extend from the secondary nipple 2 to the bonnet 3'. Since the guides 11 are, as shown, widest opposite the axis of the primary nipple 3, these guides will present a maximum deflecting surface to the fluid entering the primary nipple. Moreover, owing to the fact that the guides are widest, at the point indicated, the use of a spherical casing is made possible, and the guides are made of maximum efficiency as a means for reinforcing the casing.

Having described the invention what I claim as new and desire to secure by Letters Patent is:

In a device of the character described, a casing having a valve seat, a bonnet engaged with the casing, and having a conical bore and an upper reduced circular portion, a stem passing through and projecting from the bonnet and having a lower conical head to fit snugly within the said bore, a non-rotatable valve seatable upon the said valve seat and in screw threaded engagement with the said head, a hand wheel secured to the upper end of the stem, an adjustable nut threaded onto the stem intermediate the hand wheel and bonnet and having a depending annular apron slidably engaging over the said reduced portion of the bonnet, a washer seated on the said reduced portion of the bonnet and snugly engaging the said apron, and a coiled wire compression spring seated between the washer and nut.

In testimony that I claim the foregoing as my own, I have hereto affixed my signature in the presence of two witnesses.

JAMES WALP.

Witnesses:
I. E. NAGLE,
ELIZABETH KNAUSS.